March 7, 1967 A. TAVERA ETAL 3,307,521
SUCKLING APPARATUS FOR FEEDING YOUNG ANIMALS
Filed Aug. 2, 1965 4 Sheets-Sheet 1

INVENTORS.
ANTONIO TAVERA
STEPHEN J. LAWRENCE.
BY
ATTORNEYS.

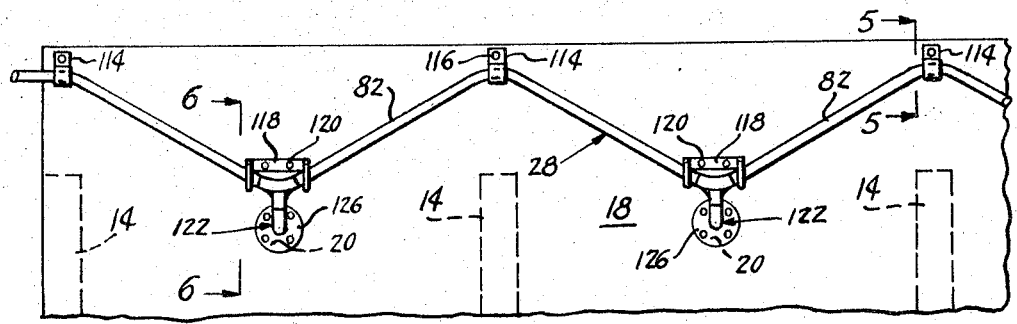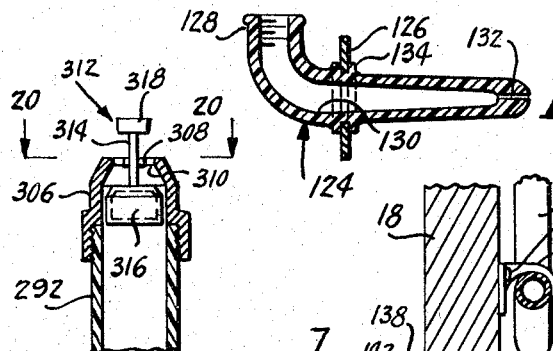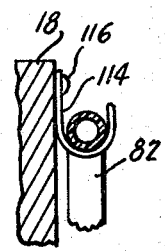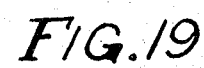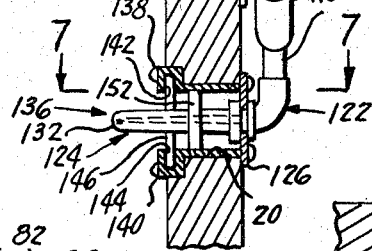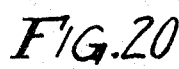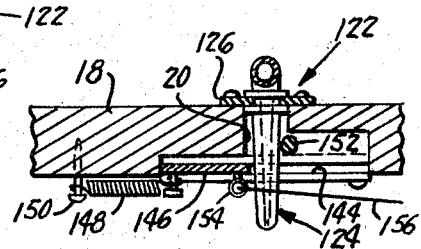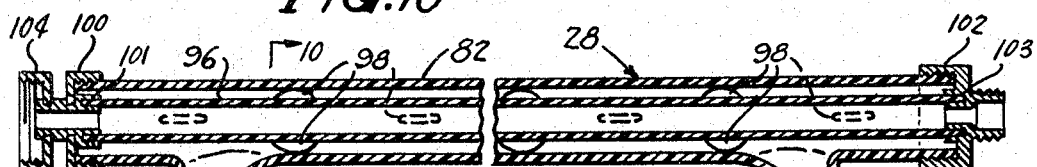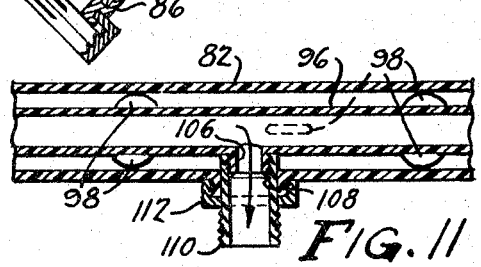

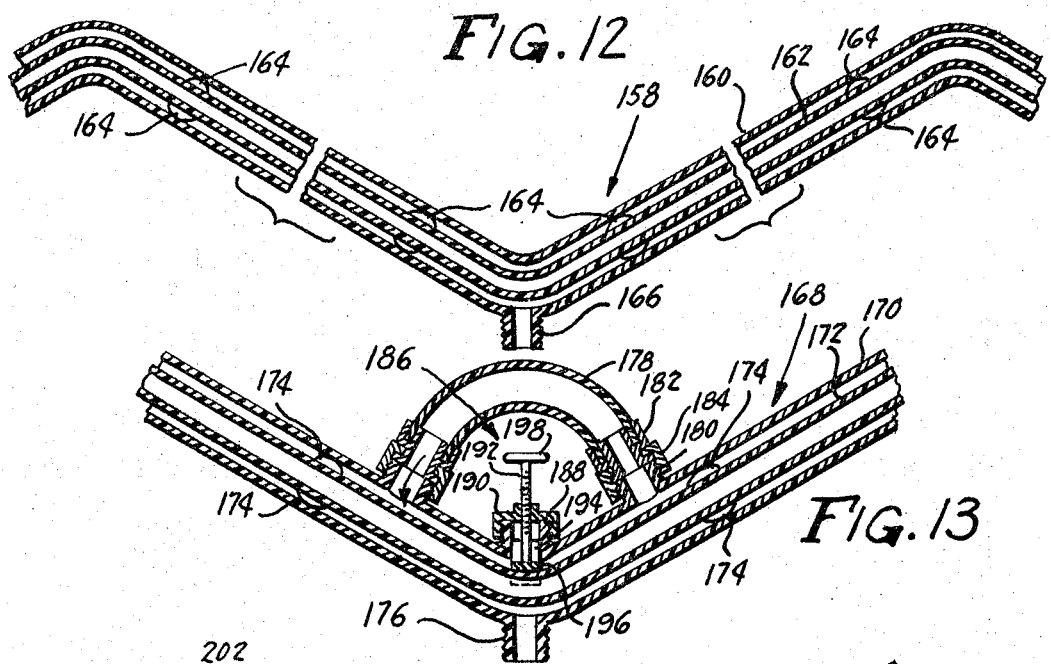
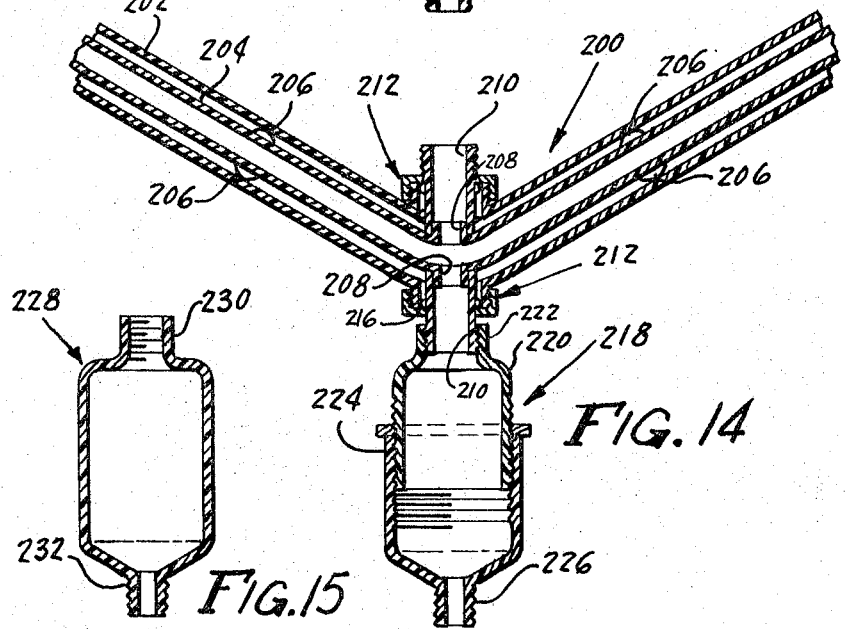
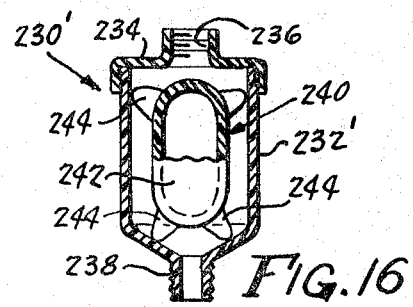

March 7, 1967 A. TAVERA ETAL 3,307,521
SUCKLING APPARATUS FOR FEEDING YOUNG ANIMALS
Filed Aug. 2, 1965 4 Sheets-Sheet 4

INVENTORS.
ANTONIO TAVERA
STEPHEN J. LAWRENCE
BY
ATTORNEYS.

United States Patent Office 3,307,521
Patented Mar. 7, 1967

3,307,521
SUCKLING APPARATUS FOR FEEDING
YOUNG ANIMALS
Antonio Tavera, Rte. 1, Box 1386, Point Pleasant Road, and Stephen J. Lawrence, Rte. 1, Box 1401, both of Elk Grove, Calif. 95624
Filed Aug. 2, 1965, Ser. No. 476,482
14 Claims. (Cl. 119—71)

This invention relates to animal feeders, and more particularly to a device for feeding milk or comparable liquids to small unweaned farm animals, such as calves, colts, lambs, pigs, kids and the like, and which is particularly adapted to the feeding of calves.

Cattle raising is, of course, a large competitive business, the methods of which are undergoing substantial change. The traditional method of calf feeding is to take the calf to its mother at regular intervals or to let the calf run with its mother at all times. In conducting large scale cattle operations on a feeding lot basis, this is undesirable for many reasons. It is often advantageous to sell the milk obtainable from the mother and feed the calf more economical substitutes. It is also advantageous to keep the calves and adult animals separated for ease of handling.

It is accordingly a primary object of the instant invention to provide an animal feeding apparatus which may conveniently accommodate as many individual animals as desired.

A further object of the instant invention is to provide a device for feeding small unweaned animals, such as calves or the like, in which a liquid is dispensed to a plurality of feeding stations.

A still further object of the instant invention is to provide a feeding apparatus for small animals equipped to dispense a warmed fluid, such as milk or the like, to a plurality of feeding stations.

A more specific object of the instant invention is to provide a liquid food delivery conduit configured in the nature of a wave having animal feeding outlets at the nadirs of such a wave to allow equal food delivery to each animal.

Another object of the instant invention is to provide a feeding station having a plurality of artificial teats for the distribution of liquid food to a plurality of small animals including means for selectively precluding the flow of such a liquid through the teats.

Another object of the instant invention is to provide an animal feeding station which may be filled either mechanically or by hand and which delivers an equal amount of liquid food to each of a plurality of small animals.

Another object of the instant invention is to provide an animal feeding device providing a liquid food delivery conduit which may be alternatively filled at the command of an operator and emptied by hungry calves.

Another more specific object of the instant invention is to provide an animal feeding device providing a liquid food delivery conduit which is emptied by hungry calves and is so constructed and arranged that the volume of the conduit may be altered by an attendant.

Other objects and advantages of the instant invention reside in the combinations of elements, arrangements of parts, and features of construction and operation, all as will be more fully pointed out hereinafter and disclosed in the accompanying drawings wherein there are shown preferred embodiments of this inventive concept.

In the drawings:

FIGURE 4 is a rear view of the feeding device of FIGURES 1 and 2;

FIGURE 5 is a cross-sectional view taken along line 5—5 of FIGURE 4 and showing the milk distribution conduit secured to the rear of the calf stalls;

FIGURE 6 is a cross-sectional view of the device of FIGURE 4 taken along line 6—6, viewing in the direction of the arrows; and showing the connection of an artificial teat;

FIGURE 7 is a cross-sectional view taken along the line 7—7 of FIGURE 6 and viewing in the direction of the arrows;

FIGURE 8 is a longitudinal cross-sectional view of the pliable nipple used in conjunction with the mounting devices shown in FIGURES 8 and 9;

FIGURE 9 is a longitudinal cross-sectional view of one form of the fluid conduits connecting the water and milk tanks of FIGURE 3 to the calf feeding nipples;

FIGURE 10 is a transverse cross-sectional view of the conduit of FIGURE 9 taken along line 10—10 thereof and viewing in the direction of the arrows;

FIGURE 11 is a longitudinal cross-sectional view showing a pipe nipple leading from the inner milk conduit to a calf feeding station;

FIGURE 12 is a longitudinal cross-sectional view of another form of fluid connection between the water and milk tanks of FIGURE 3 to the calf feeding stations showing the milk conduit as the annulus between the inner and outer pipes;

FIGURE 13 is a longitudinal cross-sectional view of still another form of fluid connection between the water and milk tanks of FIGURE 3 to the calf feeding stations;

FIGURE 14 is a longitudinal cross-sectional view of still another form of fluid connection showing a volumetrically variable bottle which may be used to accumulate and control the quantity of milk given each animal;

FIGURE 15 is a cross-sectional view of another form of bottle which is volumetrically constant;

FIGURE 16 is a cross-sectional view of another form of bottle showing an insert which may be varied to effectively change the amount of milk which may be placed in the container;

FIGURE 19 is a cross-sectional view of a float valve which may be used with the fluid delivery system of FIGURE 18;

FIGURE 20 is a cross-sectional view of the float valve of FIGURE 19 taken along line 20—20 thereof and viewing in the direction of the arrows.

Figure 1:
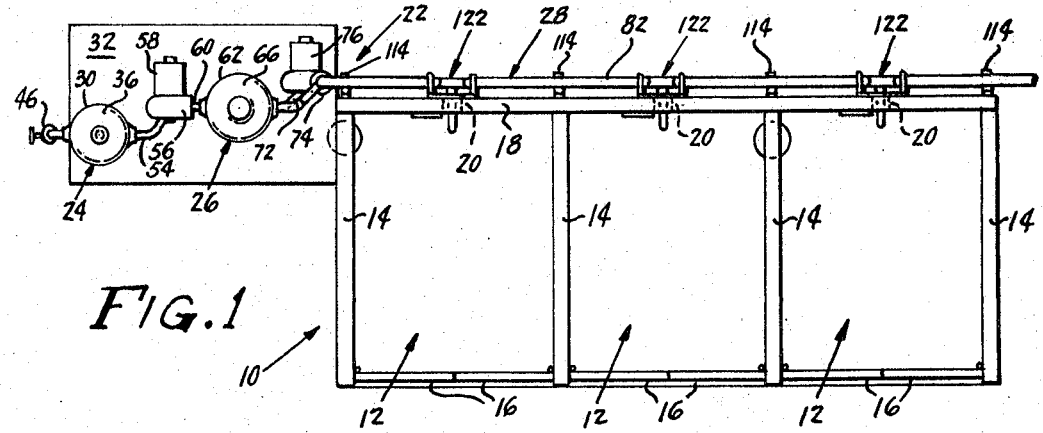
FIGURE 1 is a top plan view of the feeding device of the instant invention showing three separate feeding stalls and the necessary fluid distribution equipment.
Figure 2:
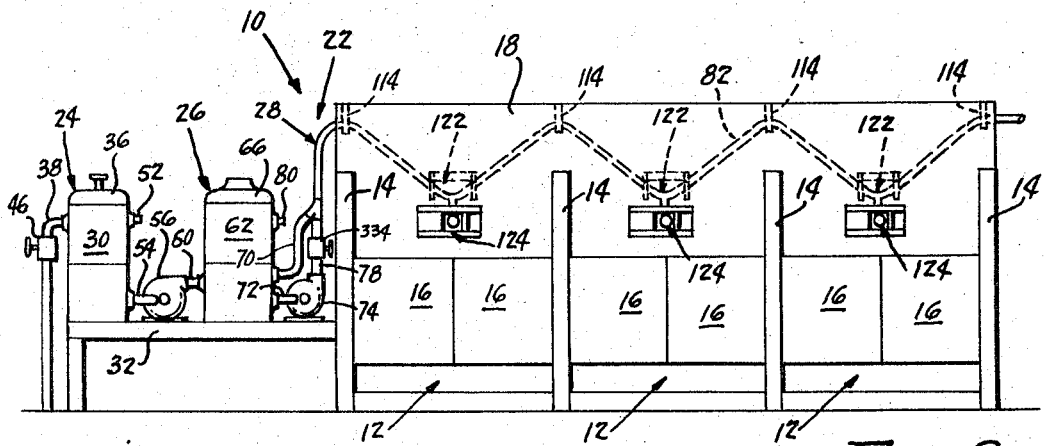
FIGURE 2 is a front elevational view of the device shown in FIGURE 1.
Figure 3:
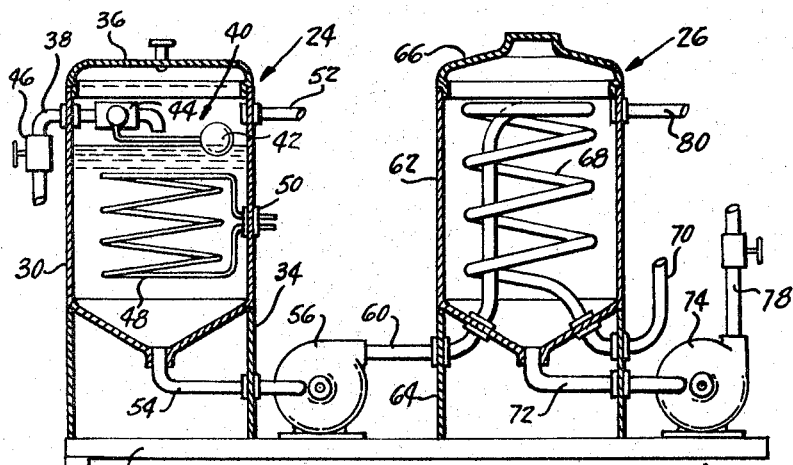
FIGURE 3 is an enlarged cross-sectional view of the milk and water tanks of the instant invention showing the necessary fluid connections.

Referring now to the drawings in detail, wherein like reference characters designate like elements throughout the several views thereof, there is indicated generally at 10 a calf feeding device having a plurality of animal feeding stalls 12 separated by parallel vertical walls 14 with swinging doors 16 providing access thereto. A vertical wall 18 completes the enclosure of stalls 12 and forms a plurality of openings 20 which receive an animal feeding nipple as more fully explained hereinafter. As illustrated in FIGURES 1 and 2, stalls 12 are arranged in a linear configuration, but it should be understood that any number of stalls may be arranged in any suitable configuration, such as circular.

A fluid distribution system shown generally at 22 includes a hot water tank shown generally at 24 and a milk tank shown generally at 26 connected by a serpentine conduit indicated generally at 28 to the interior of each of feeding stalls 12 as more fully explained hereinafter. Hot water tank 24 includes a housing 30 secured to a platform 32 by a suitable bracket 34 and is provided with a removable lid 36. A water inlet pipe 38 is equipped with a fluid level actuating valve indicated generally at 40 comprising a float 42 pivotally mounted to a valve 44 by a suitable conventional connection. Conduit 38 is provided with a valve 46 exteriorly of housing 30 for selectively delivering make-up water into the interior of tank 24.

A heat supplying means, such as an electrical heating coil 48 is mounted within tank 24 by suitable waterproof connections 50 and leads to a power source for heating the fluid therein. A water return pipe 52 is provided so that water pumped through the system may be returned and recycled. A hot water outlet 54 is in fluid connection with the lower part of housing 30 and is connected to a conventional pump 56 driven by a commercial electric motor 58 for delivering hot water through an outlet connection 60 into a housing 62 of milk tank 26.

Housing 62 is secured to platform 32 by a suitable bracket 64 and is equipped with a removable lid 66 in much the same way that hot water tank 24 is so constructed. Positioned interiorly of housing 62 is a heat transfer coil 68 which acts to transfer heat from the warmed water delivered from tank 24 to milk provided within tank 26. Hot water passing through the heat transfer coil 68 leaves the interior of housing 62 through an outlet connection 70 and is used to retain the milk in a warm condition as more fully explained hereinafter.

Communication with the lower end of housing 62 is an outlet conduit 72 leading to a conventional pump 74 driven by a suitable electric motor 76 which acts to deliver milk through an outlet conduit 78. As more fully explained hereinafter, conduits 70, 78 are connected to deliver warmed milk to the interior of stalls 12 through conduit 28. A milk return line 80 is provided to redeliver milk into housing 62 after it has passed through conduit 28 should it be desirable to recirculate warmed milk.

It should be apparent that the opening of valve 46 will deliver a quantity of water within hot water tank 24 which may be heated by electric coil 48 with the delivery of hot water to heat transfer coil 68 being accomplished by pump 56. The placement of a suitable quantity of milk within milk tank 26 will result in the heating thereof with warm milk being delivered to stalls 12 by pump 74. As more fully explained hereinafter, water and/or milk may be recirculated to maintain a warm liquid food delivery to animals in stalls 12.

As shown in FIGURES 9-11 inclusive, conduit 28 includes an exterior tubular pipe 82 having a 45° inlet 84 provided with a fluid tight connector 86 and a threaded female collar 88 for engagement with hot water delivery conduit 70. Hot water will enter outer tubular pipe 82 through collar 88 and flow therethrough to a 45° outlet branch 90 provided with a fluid tight connector 92 and a threaded female collar 94 in which is releasably secured water return pipe 52. Accordingly, the hot water injected into inlet branch 84 will flow through conduit 82 and return to hot water tank 24 through branch line 90.

Conduit 28 also includes an inner concentric tube 96 provided with a series of radially extending lugs 98 which operate to space tube 96 within tube 82. The terminal ends of tube 98 are positioned within the center of tube 82 by a pair of apertured collars 100, 102 threadably mounted on the outside of conduit 82 and providing an annular groove 101, 103 for receiving the ends of tube 96. Collar 100 is in fluid communication with a threaded female collar 104 which is releasably secured to milk delivery outlet 78. Collar 102 is releasably connected to milk return line 80 so that milk within milk tank 26 may be recirculated.

From the above described milk distribution system, it will be seen that there is provided a concurrent heat transfer system within conduit 28 to retain milk in a warm condition. If it is desirable to change the heat transfer mechanism within conduit 28 to a countercurrent system, it is necessary only to connect hot water outlet 70 to threaded female collar 78 and connected water return line 52 to threaded collar 88.

Inner tube 96 is provided with a plurality of equally spaced male threaded outlets 106 with outer tube 82 being provided with similar and larger outlets 108. An internally and externally threaded nipple 110 is positioned through outlet 108 and releasably secured to outlet 106 as shown in FIGURE 11 with an interiorly threaded collar 112 making the connection secure and liquid tight.

A first series of upwardly facing hook-shaped supporting members 114 are secured at equal intervals to vertical wall 118 by a frictional fastener 116 as shown in FIGURES 4 and 5 to provide one support for conduit 28. A set of downwardly facing hook-shaped supporting members 118 are secured by frictional fasteners 120 at equal intervals between supporting members 114 and downwardly spaced therefrom as shown in FIGURES 4 and 6. Conduit 28 is preferably made of a flexible material and is placed over hook-shaped supporting member 114 to provide a zenith in the path of the conduit 28 and under hook-shaped supporting members 118 to provide a nadir. Since upper supporting members 114 are equally spaced in a horizontal plane and since lower supporting members 118 are equally spaced in a horizontal plane, the filling of conduit 28 with milk or another liquid food will insure that each animal in stall 12 is provided with an equal amount of food since the liquid in inner tube 98 will not flow past the zenith adjacent supports 114 when pump 74 is inoperative.

Secured to each of threaded nipples 110 is a liquid feeding device shown generally at 122 including an animal feeding teat shown generally at 124 mounted at the rear of vertical wall 18 by a rigid bracket 126 so that teat 124 extends through opening 20 of wall 18. Teat 124 is substantially L-shaped in configuration and is provided with a large threaded end 128 secured to threaded nipple 110 and an enlarged central opening 130 communicating with a small opening 132 at the extremity of the other end. The outer surface of teat 124 is provided with a transverse annular groove providing collar 134 which receives bracket 126 as shown in FIGURE 8.

A teat closing device shown generally at 136 is provided on the inner side of wall 18 and includes an upper and lower bracket 138, 140 providing aligned linear grooves 142, 144. Mounted within grooves 142, 144 is a reciprocable door 146 biased in the leftward direction as shown in FIGURE 7 by a spring 148 secured to wall 18 by a pin 150. A vertical post 152 is provided within wall 18 on the opposite side of teat 124 from spring 118. A suitable means for reciprocating door 146 is provided, such as eye 154 secured by a wire 156 or the like, to a control means as more fully explained hereinafter.

When it is desired to close teat 124, as may be necessary during the filling of conduit 28, it is necessary only to pull wire 158 thereby sliding door 146 within grooves 142, 144, bending teat 124 about vertical post 152 and thus closing off central passageway 130 thereof. When conduit 28 is filled and the animals to be fed are within stalls 12 it is necessary only to release the tension on wire 156 and teat 124 will be in a suitable feeding position as shown in FIGURES 6 and 7.

Another embodiment of a milk distribution conduit is shown generally at 158 in FIGURE 12 and includes an outer conduit 160 in which is placed an inner conduit 162 having lugs 164 spacing it concentrically. Hot water from tank 24 passes through inner conduit 162 with milk from tank 26 passing in the annulus between conduits 160, 162. Outer conduit 160 is provided with a series of externally threaded outlets 166 which are threadably connected to teat 124 in much the same manner that threaded nipple 110 is connected thereto. It will be seen that the embodiment of FIGURE 12 is considerably simpler than the embodiments of FIGURES 9 to 11 inclusive, since fewer parts are needed to provide an outlet to teat 124. On the other hand, milk passing in the annulus between conduits 160, 162 will not be regulated to the same degree of control since it will be effected by heat loss through outer tube 160.

Still another embodiment of a distribution conduit is shown generally at 168 in FIGURE 13 and includes an outer conduit 170 spaced from an inner conduit 172 by lugs 174 secured to tube 172. Outer conduit 174 is provided with a threaded outlet 176 quite similar to outlet 166 of conduit 158. In this embodiment milk is delivered between the annulus of tubes 170, 172 and the supply thereof may be increased by the utilization of an additional milk delivery tube 178 which is provided with a conduit (not shown) in fluid communication with milk outlet 78 of pump 74. Additional milk delivery tube 178 is connected to the annulus between tubes 170, 172 by an externally threaded outlet 180 on tube 170 in fluid communication with a connector 182 and secured thereto by a threaded collar 184.

Another feature of the embodiment of FIGURE 13, and one which may be utilized with any of the embodiments herein shown, is a spacer indicated generally at 186 which acts to position interior tube 172 concentrically with outer tube 170 at the bend thereof. Spacer 186 includes an externally threaded outlet 188 communicating with the interior of tube 170 and a centrally apertured collar 190 secured to connection 188.

Residing in the central aperture of collar 190 is a threaded shank 192 carrying a guide 194 reciprocable within the opening in outlet 188 and providing a saddle 196 on the lower end thereof which is complementarily shaped to be received over tube 172. Shank 192 is provided with a suitable handle 198 by which shank 192 may be threaded in and out of collar 190. Spacer 186 is appropriate since the bending of conduit 168 will inherently tend to position inner conduit 172 adjacent the upper edge of tube 170 at the bend, thus altering the flow characteristics therearound.

A further embodiment of a milk delivery conduit is shown generally at 200 in FIGURE 14 and includes an outer tube 202 spaced from an inner tube 204 by suitable lugs 206. In this embodiment milk flows through inner tube 204 in a manner similar to that of FIGURES 9 to 11 inclusive, and exits through an unthreaded outlet 208 provided on inner tube 204. A nipple 210 is provided having one unthreaded end secured about unthreaded outlet 208 by a securing collar indicated generally at 212. Collar 212 is threadably mounted on a threaded outlet 214 on outer tube 202 and includes a shoulder cooperating with an annular ring 216 on nipple 210.

Another feature of the embodiment of FIGURE 14, and one which is utilizable with the other embodiment shown herein, is a bottle indicated generally at 218 for accommodating an increased supply of milk for an individual animal. Bottle 218 is volumetrically variable and includes an inner section 220 having a threaded reduced diameter section 222 secured on threads of nipple 210. The lower end of section 220 is threaded and is received in an outer section 224 having a threaded discharge spout 226 which may be secured in teat 124.

In the event that a particular calf is ill or underweight, it may be placed in a stall 12 which is equipped with a bottle 218 such that that particular calf will receive an additional amount of liquid food when conduit 200 is filled. As shown in FIGURE 14 an aditional threaded nipple 210 extends upwardly from bottle 218 and provides a means of inserting medicine or the like in bottle 218 after which threaded nipple 210 may be closed. It should be apparent that the volume of bottle 218 may be varied throughout a wide range of volumes by making up the threads that connect sections 220, 224.

Referring now to FIGURE 15, there is shown generally at 228 a volumetrically constant bottle having an interiorly threaded connection 230 which may be secured to any of outlets 110, 166, 176, or 210. Bottle 228 also includes an exteriorly threaded discharge spout 232 for securement with teat 124.

Referring now to FIGURE 16, there is indicated generally at 230' another form of bottle including a main container portion 232' which is threaded on the upper end thereof and receives a removable lid 234 having an interiorly threaded inlet 236 for securement with any of the conduits previously indicated. Communicating with the interior of main container portion 232' is an externally threaded discharge spout 238 for securement with teat 124. Positioned interiorly of main container portion 232' is a filler shown generally at 240 including a closed body portion 242 and a series of lugs 244 spacing filler 240 from the interior of main container portion 232'. It will be seen that bottle 230' provides a plurality of incremental volumes which may be added to the feeding of a particular animal by removing filler 240 and inserting therein a smaller filler.

Figure 17:
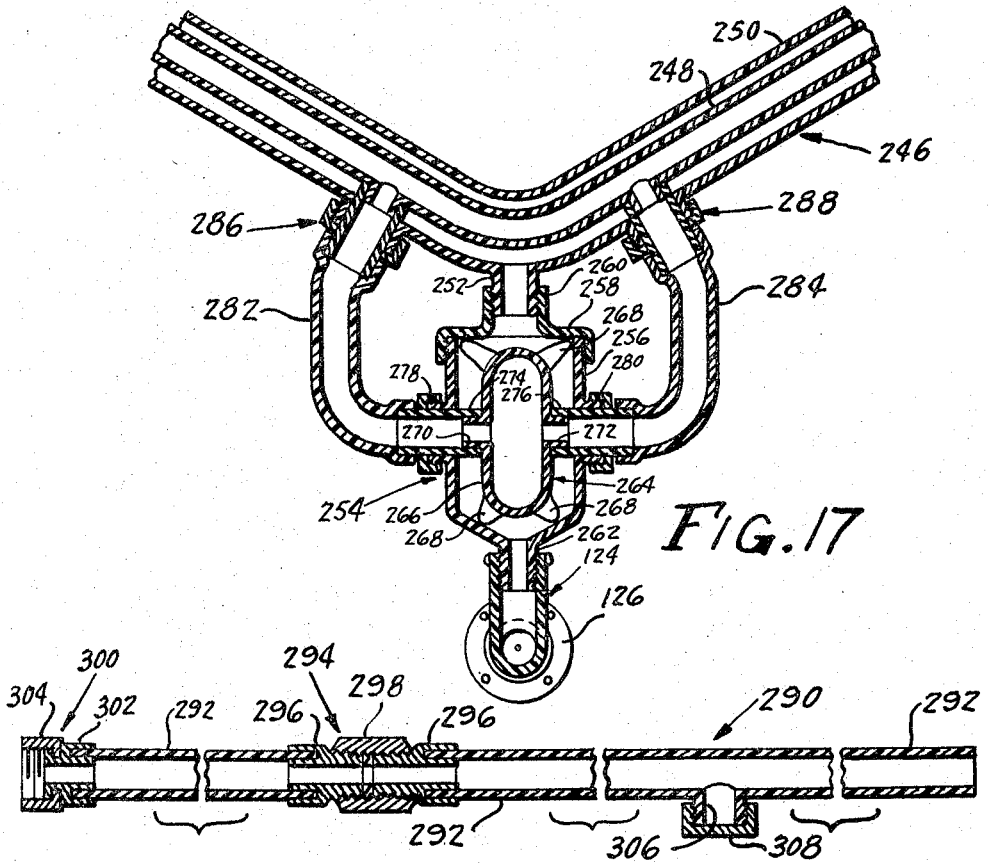
FIGURE 17 is a longitudinal cross-sectional view of another form of animal feeding conduit showing a warming fluid by-pass to warm the milk in a bottle type container, such as that of FIGURE 16.

Referring now to FIGURE 17, there is indicated generally at 246 another form of milk distribution conduit having an inner water carrying conduit 248 and an outer concentric tube 250 providing an annular flow area through which warmed milk may pass. Outer tube 250 is provided with an externally threaded outlet 252 to which is secured a container shown generally at 254 of similar configuration to container 230' of FIGURE 16.

Bottle 254 includes a main container portion 256 having threads on the upper rim thereon for the reception of a removable lid 258 having an interiorly threaded inlet 260 for reception on outlet 252. Main body portion 256 also includes an externally threaded outlet 262 secured onto teat means 124. A filler means shown generally at 264 is positioned within body portion 256 and includes a main wall 266 enclosing a predetermined volume and spaced from main body portion 256 by a plurality of lugs 268.

Filler means 264 includes an inlet opening 270 and an outlet opening 272 communicating within the interior thereof. An inlet nipple 274 and an outlet nipple 276 provide communication with inlet and outlet 270, 272 of filler means 264 and extend through a pair of externally threaded inlets and outlets 278, 280 which are threadably connected to an inlet conduit 282 and an outlet conduit 284. Conduits 282, 284 are in fluid communication with interior water carrying conduit 248 by a suitable connection shown generally at 286, 288 which are generally similar to the outlet connection of FIGURE 11. It is thus seen that the filling of the annulus between conduits 248, 250 with milk or other liquid food results in the filling of bottle 254 so with hot water circulating through inner conduit 248, inlet conduit 282 and filler means 264 resulting in the warming of milk or other liquid food within bottle 254.

Figure 18:
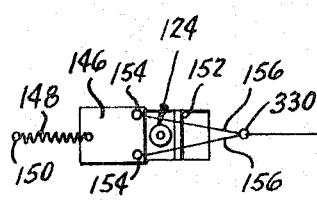
FIGURE 18 is a cross-sectional view of still another embodiment of the fluid connection which may be used in a much simplified application.

Referring now to FIGURES 18, 19 and 20, there is shown generally at 290 another form of milk distribution system having a single conduit 292 which may be secured together by a coupling indicated generally at 294. Coupling 294 includes a pair of substantially identical externally threaded connectors 296 fastened onto terminal ends of single conduit 292 and connected together by an internally threaded sleeve 298.

Conduit 292 is provided with an inlet indicated generally at 300 including a connector 302 secured to one end of conduit 292 and having secured thereon an internally threaded collar 304 which customarily receives a milk valve and a small tank into which preheated milk may be poured. Spaced along conduit 292 are a plurality of externally threaded outlet connections 306 which may be provided with a threaded cap 308 when the system is closed. Cap 308 may be removed and teat means 124 or any of bottles 218, 288, or 230 may be secured thereto.

The other end of milk distribution line 290 is equipped with a float valve, such as is shown in FIGURES 19 and 20, which includes a valve head 306 secured in any convenient manner about the terminal end of conduit 292 and providing a valve stem guide 308 and a plurality of air escape apertures 310. Mounted within valve head 306 is a float valve indicated generally at 312 having a substantially cylindrical shank 314 mounted within valve guide 308, a float and seal member 316 secured to the lower end of shank 314 and a valve stop 318 on the upper end of shank 314.

When using the embodiment of FIGURES 18, 19 and 20, an attendant will prepare a batch of prewarmed milk, as by heating it on a stove, and pouring it through a milk valve and/or a funnel in fluid communication with inlet 300 or milk distribution 290. Inlet 300 will be positioned above the zenith formed by the configuration of milk distribution system 290, which is substantially identical wtih that shown in FIGURE 4, such that the liquid food will fill conduit 292. Since valve 312 is positioned at a temminal zenith, the filling of conduit 292 will be apparent to an attendant by the rising of valve stop 318.

Although any of the embodiments hereinbefore described may conveniently be sequentially operated by an attendant, it has been found advantageous to provide a simplfied means for such operation. There is shown generally at 320 in FIGURE 21 an automatic control device for actuating all of the necessary components of the instant invention. Control means 320 includes an electrical timer switch 322 having a manually actuated dial 324 for controlling the length of time milk is dispensed through the milk distribution systems of FIGURES 9 to 11, FIGURE 12, FIGURE 13, FIGURE 14 or FIGURE 17. Switch 322 is of conventional type and is so constructed and arranged that it will oscillate an arm 326 at preselected times.

Figure 21:
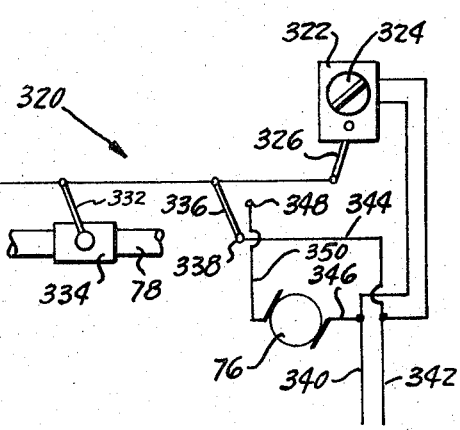
FIGURE 21 is a schematic view of a timing circuit which is utilized to control the opening of the animal feeding nipple and the flow of milk through the milk distribution system.

Secured to the terminal end of arm 326 is a control wire 328 secured by a ring or the like 330, to wires 156 to reciprocate door 146 in order to bend teat means 124 about vertical post 152. Secured to control wire 328 is an arm 332 pivotally connected to a valve 334 which is shown in FIGURE 21 in the closed position and which is mounted in milk delivery conduit 78. Also secured to control wire 328 is a metallic pump control arm 336 pivotally mounted at 338. A pair of electrical wires 340, 342 are connected to a suitable power source and lead to timer 322 to provide a source of energy for operation.

Branching from electric line 342 is a connector 344 secured to pivotal mounting 338. Another branch line 346 is secured to electrical inlet 340 and is in electrical communication with electric motor 76 of pump 74. An electrical contact 348 is positioned within the path of pivoted arm 336 and is in electrical communication with the other side of electric motor 76 through a wire 350.

It will be seen that the oscillation of arm 326 to the right from the position shown in FIGURE 21 will act to close teat means 124 and open valve 334 and actuate pump 76. This will effectuate the filling of any of the milk distribution systems previously mentioned. When timer 322 measures the appropriate time to fill these milk distribution systems, it will act to pivot arm 326 to the left as shown in FIGURE 21 to shut off electric motor 76, close valve 334 leading to these milk distribution systems and open gate or door 146 to allow animals to feed through teat means 124.

Since the configuration of each of the milk distribution systems is such to deliver a predetermined equal amount to each of the feeding animals, the cyclic operation of arm 326 will control and measure the exact amount of liquid food delivered to the animals. When the feeding operation is complete, or when it is desired to place another group of animals in stalls 12, an attendant may position dial 324 to hold door 146 in a closed position and valve 334 in the open position. It is to be understood that water pump 56 continuously delivers warm water through the concentric tubes of the milk delivery system to insure that the milk therein is maintained at a correct temperaure.

It is now seen that there is herein provided an improved animal feeder having all of the objects of this invention and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative and not in a limiting sense.

We claim:
1. A liquid feeding device for animals comprising
   a substantially vertical wall having at least one aperture therein,
   a liquid feed conduit extending longitudinally on one side of said wall and closely adjacent thereto, said conduit being arranged in a serpentine configuration having at least one nadir between zeniths, and
   conduit means communicating with said conduit at said nadir extending through said aperture providing teat means having an aperture communicating with said conduit means on a side of said wall opposite from said one side, said teat means being made of a pliable resilient material, said device including a slidable means on said wall at said aperture for selectively pinching and collapsing said teat means to preclude the flow of liquids through said teat aperture, the portions of the conduit between the nadir and the zenith constituting a reservoir for the teat means.

2. The structure of claim 1 including a post mounted on one side of said teat means, a door and means mounting said door from a first position on said one side of said teat means for bending said teat means about said post to a second position on another side of said teat means for releasing said teat means from engagement with said post.

3. A liquid feeding device for animals comprising
   a substantially vertical wall having at least one opening therein,
   a liquid feed conduit on one side of said wall and closely adjacent thereto arranged in a longitudinally extending serpentine configuration having at least one nadir between zeniths,
   conduit means communicating with said conduit extending through said opening providing teat means of a pliable resilient material having an aperture on the end of said conduit means on a side of said wall opposite said one side and
   means on said wall at said opening for selectively blocking said aperture, said blocking means including means for bending and pinching said teat means until said teat is closed to prevent the loss of liquid feed.

4. The structure of claim 3 wherein said conduit includes a first tube and a second smaller tube mounted within said first tube means for delivering a liquid food under pressure to one of said tubes and means for delivering a heated liquid to the other of said tubes.

5. The structure of claim 4 including a hot water tank having a heating element therein and a liquid food tank having a heat exchanger therein, means providing fluid connection between said hot water tank and said heat exchanger of said milk tank, said hot water tank, heating element and heat exchanger constituting said delivery means.

6. The structure of claim 1 wherein said communicating means includes a receptacle having an inlet and an outlet and means releasably securing said outlet of said receptacle to said teat means.

7. The structure of claim 6 wherein said receptacle includes means for varying the volume of said receptacle.

8. The structure of claim 7 wherein said receptacle includes an exteriorly threaded inner section received in an interiorly threaded outer section, said varying means including said threads.

9. The structure of claim 7 wherein said receptacle includes a releasably mounted lid and said varying means includes filler means removably positioned within said receptacle, said filler means including a body wall encompassing a predetermined volume.

10. The structure of claim 1 wherein said conduit includes a first tube and a second smaller tube mounted within said first tube, means for delivering a liquid food under pressure to one of said tubes and means for heating and delivering a liquid to the other of said tubes, said communicating means includes a receptacle having a releasably mounted lid, an inlet, an outlet and means releasably securing said outlet of said receptacle to said teat means, filler means removably positioned within said receptacle including a body wall encompassing a predetermined volume, and means providing fluid communication between said tube carrying said heated liquid and said body wall of said filler means.

11. An animal liquid feeding device comprising
a plurality of feeding stalls of a size sufficient to accommodate a small unweaned animal including a substantially vertical wall at the rear of said stalls providing at least one opening positioned substantially in the center of said stall communicating between said stall and the rear side of said wall,
a liquid feed conduit,
means mounting said conduit longitudinally on said rear wall of said stall in a serpentine configuration having alternating nadirs and zeniths, said nadirs being located adjacent said openings in said wall,
means communicating with said conduit at a point adjacent said nadirs including a teat means of a pliable resilient material having an outlet aperture communicating with said conduit, said teat means extending through said opening in said wall a length sufficient to allow an animal to feed therethrough, said wall including a slidable means at said opening for selectively pinching and bending said teat means until said teat means is closed so as to prevent the loss of liquid feed.

12. The structure of claim 11 wherein said conduit includes a first tube and a second smaller tube within said first tube, said tubes providing means spacing said second tube concentrically within said first tube, said device including a hot water tank having a heating element therein, a liquid food tank having a heat exchanger therein, said hot water tank being in fluid communication with said heat exchanger, means delivering liquid food from said liquid food tank into one of said tubes and means delivering heated water from said heat exchanger into the other of said tubes and means for returning said water from said water carrying tubes to said hot water tank.

13. The structure of claim 11 wherein said conduit includes a single tube having a milk inlet at one end thereof at one of said zeniths and a float valve at the other end of said tube.

14. The structure of claim 11 wherein said configuration in plan is a plurality of juxtaposed V's, said zeniths being substantially horizontally aligned and said nadirs being substantially horizontally aligned.

References Cited by the Examiner
UNITED STATES PATENTS

| | | | |
|---|---|---|---|
| 662,384 | 11/1900 | Armstrong | 119—71 |
| 2,629,360 | 2/1953 | Hoffmann | 119—71 |
| 3,081,738 | 3/1963 | Heron | 119—71 |
| 3,097,627 | 7/1963 | Garcia | 119—51.11 |
| 3,192,902 | 7/1965 | Gammill | 119—51.11 |
| 3,216,397 | 11/1965 | Pickard | 119—71 |
| 3,228,377 | 1/1966 | Grassano | 119—72.5 |
| 3,234,910 | 2/1966 | Moloney | 119—51.11 |

SAMUEL KOREN, *Primary Examiner.*

ALDRICH F. MEDBERY, *Examiner.*